(12) United States Patent
Kato et al.

(10) Patent No.: US 6,435,658 B1
(45) Date of Patent: Aug. 20, 2002

(54) INK JET RECORDING METHOD

(75) Inventors: Masao Kato, Tochigi; Nobuyuki Matsumoto, Tokyo; Fumihiro Gotoh, Kanagawa; Akitoshi Yamada, Kanagawa; Tetsuya Suwa, Kanagawa; Yoichi Takada, Kanagawa; Noriyasu Asaki, Kanagawa, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/942,564

(22) Filed: Aug. 31, 2001

(30) Foreign Application Priority Data

Sep. 4, 2000 (JP) .......................................... 2000-267818

(51) Int. Cl.$^7$ .................................................. B41J 2/21
(52) U.S. Cl. .............................. 347/43; 347/96; 347/100
(58) Field of Search .............................. 347/43, 15, 95, 347/96, 98, 100; 106/31.27, 31.6, 31.13, 31.43, 31.51

(56) References Cited

U.S. PATENT DOCUMENTS

| | | | |
|---|---|---|---|
| 5,428,383 A | 6/1995 | Shields et al. | 347/96 |
| 5,488,402 A | 1/1996 | Shields et al. | 347/96 |
| 5,976,230 A | 11/1999 | Askeland et al. | 106/31.27 |
| 6,007,182 A | 12/1999 | Matsubara et al. | 347/43 |
| 6,062,674 A | 5/2000 | Inui et al. | 347/43 |
| 6,126,268 A | * 10/2000 | Askeland et al. | 347/43 |
| 6,309,062 B1 | * 10/2001 | Hickman et al. | 347/96 |

FOREIGN PATENT DOCUMENTS

| | | |
|---|---|---|
| EP | 0 956 962 A2 | 11/1999 |
| JP | 6-106841 A | 4/1994 |
| JP | 11-334101 A | 12/1999 |
| JP | 11-343441 A | 12/1999 |

* cited by examiner

*Primary Examiner*—Lamson Nguyen
(74) *Attorney, Agent, or Firm*—Fitzpatrick, Cella, Harper & Scinto

(57) ABSTRACT

A reactive color ink that contains a metal ion and exhibits mutual reactivity with a blank ink is applied in an area including a print area, which has been formed by applying the blank ink on a recording medium, and an area surrounding the print area, a distance between an edge of the print area and an outer edge of the surrounding area being up to four pixels. This ink application is performed so that a value at least equal to 0.01 is obtained from a calculation where a metal ion concentration % by weight in the reactive color ink applied in the area including the print area and the surrounding area is multiplied by a print duty % of the reactive color ink applied in the area including the print area and the surrounding area.

19 Claims, 3 Drawing Sheets

INK JET RECORDING METHOD

BACKGROUND OF THE INVENTION

1. Field of the Invention

The present invention relates to an ink jet recording method with which an image is recorded on a recording medium by discharging ink onto the recording medium.

2. Related Background Art

In the field of ink jet recording, there have conventionally been used blank inks including pigments to form, in particular on plain paper, black images excellent in printing density, printing quality, and fastness properties such as water fastness and light fastness. There have also conventionally been used ink sets that prevent blurs (hereinafter referred to as "bleeding") that occur at boundaries between image areas printed with blank inks and their adjacent image areas printed with color inks or prevent irregular blurry white images (hereinafter referred to as "white haze") that occurs in black image areas at boundaries with color image areas.

Representative techniques are disclosed in Japanese Patent Application Laid-Open No. 6-106841, Japanese Patent Application Laid-Open No. 9-11850, Japanese Patent Application Laid-Open No. 11-334101, Japanese Patent Application Laid-Open No. 11-343441, U.S. Pat. No. 5,428,383, U.S. Pat. No. 5,488,402, and U.S. Pat. No. 5,976,230. In these documents, bleeding is suppressed using an ink set that includes a black ink and color inks, with at least one of the color inks having mutual reactivity with the black ink and other color inks having non-reactivity with the black ink. There is also described an ink jet recording method using this ink set. In particular, there is disclosed a printing method (hereinafter referred to as "underprinting") with which a color ink having reactivity with the black ink is printed over an black ink print area to prevent bleeding at boundaries between print areas formed with the black ink and print areas formed with the color inks having non-reactivity with the black ink.

As a result of studies conducted by the inventors, however, it has been newly found that the underprinting described above has the following problems.

The first problem is that the aforementioned prior art documents do not specifically describe how to apply the color ink having mutual reactivity with the black ink to the black print area during the underprinting. Depending on the manner in which the color ink is applied, a sufficient effect of preventing bleeding cannot be obtained. In particular, although there is a description concerning the metal ion concentrations of the inks, it has been newly found that the metal ion concentrations are not the main factor for suppression of bleeding.

The second problem is that because only the color ink having reactivity with the black ink is applied (underprinted) in the black print area, the color phase direction in the black print area is shifted toward the color phase of the underprinted color ink. Further, if the underprinted color ink spreads outside the black print area, the spreading color ink causes a color change from the original color around the black print area. This problem becomes more serious if deviations in impingement position between black ink droplets and color ink droplets occur for some reason such as cock ring that is a phenomenon where a recording sheet is warped in a wave manner due to the adhesion of an ink on the recording sheet.

SUMMARY OF THE INVENTION

The present invention has been made in the light of the above-mentioned problems of the ink jet recording method utilizing the underprinting technique. The object of the present invention is to clearly define the conditions that should be satisfied when a reactive color ink having a mutual reactivity with a black ink is underprinted in a black ink print area, and to provide an ink jet recording method with which bleeding and white haze are suppressed.

The stated object is achieved by an ink jet recording method that uses an ink set including a black ink and a plurality of color inks, at least one of the plurality of color inks containing a metal ion and being a reactive color ink that exhibits mutual reactivity with the black ink, each color ink other than the at least one reactive color ink being a non-reactive color ink that exhibits non-reactivity with the black ink, the ink jet recording method including: a step for applying the at least one reactive color ink in an area in which the metal ion becomes effective at promoting a reaction between the black ink and the at least one reactive color ink, where the at least one reactive color ink is applied in the area so that a value at least equal to 0.01 is obtained from a calculation where (a metal ion concentration (% by weight) in the at least one reactive color ink applied in the area) is multiplied by (a print duty (%) of the at least one reactive color ink applied in the area).

The stated object is also achieved by an ink jet recording method that uses an ink set including a black ink and a plurality of color inks, at least one of the plurality of color inks containing a metal ion and being a reactive color ink that exhibits mutual reactivity with the black ink, each color ink other than the at least one reactive color ink being a non-reactive color ink that exhibits non-reactivity with the black ink, the ink jet recording method including: a step for applying the at least one reactive color ink in an area in which the metal ion becomes effective at promoting a reaction between the black ink and the at least one reactive color ink, where an application amount per unit area of the metal ion applied in the area is at least equal to $0.1$ $ng/mm^2$.

By regulating the metal ion concentration and print duty of the reactive ink underprinted in the black print area in the manner described above, it becomes possible to obtain an effect of preventing bleeding and white haze occurring at the boundary between the black print area and an adjacent print area formed with the non-reactive color ink.

Here, it is preferable that the total application amount of the at least one reactive color ink applied in the area is at least equal to 50% of a total application amount of each non-reactive color ink applied in the area.

Also, a print duty of the at least one reactive color ink applied in the area may be at least equal to 10%.

Further, the area includes a print area formed with the black ink and an area surrounding the print area, a distance between an edge of the print area and an outer edge of the surrounding area being up to four pixels. By doing so, even if the area in which the reactive color ink is applied is shifted from the black print area to some extent, it becomes possible to obtain the effect of preventing bleeding and white haze by underprinting the reactive color ink.

Further, the metal ion may be at least one polyvalent metal cation selected from a group consisting of $Mg^{2+}$, $Ca^{2+}$, $Cu^{2+}$, $Co^{2+}$, $Ni^{2+}$, $Fe^{2+}$, $La^{3+}$, $Nd^{3+}$, $Y^{3+}$, and $Al^{3+}$.

Further, each reactive color ink may contain metal salt whose amount is within a range of from 0.1 to 15% by weight based on a total weight of the reactive color ink.

Furthermore, the black ink may contain salt and uses a black pigment as a coloring material.

The stated object is further achieved by an ink jet recording method that uses an ink set including a black ink and a plurality of color inks, at least one of the plurality of color inks being a reactive color ink that exhibits mutual reactivity with the black ink, each color ink other than the at least one reactive color ink being a non-reactive color ink that exhibits non-reactivity with the black ink, where the plurality of color inks include specific color inks that have a relation where overlaying of the specific color inks produces a black color, and the specific color inks include at least one reactive color ink and are applied in an area including at least a print area formed with the black ink.

This ink jet recording method of the present invention makes it possible to suppress the change of black color tone in the black print area caused by the application of the reactive color ink.

DESCRIPTION OF THE PREFERRED EMBODIMENT

While an embodiment of the present invention is described in detail below, it is to be understood that the invention is not limited to the embodiment and cover various modifications included within the spirit and scope of the invention.

<Construction of Ink Jet Recording Apparatus>

Figure 1:
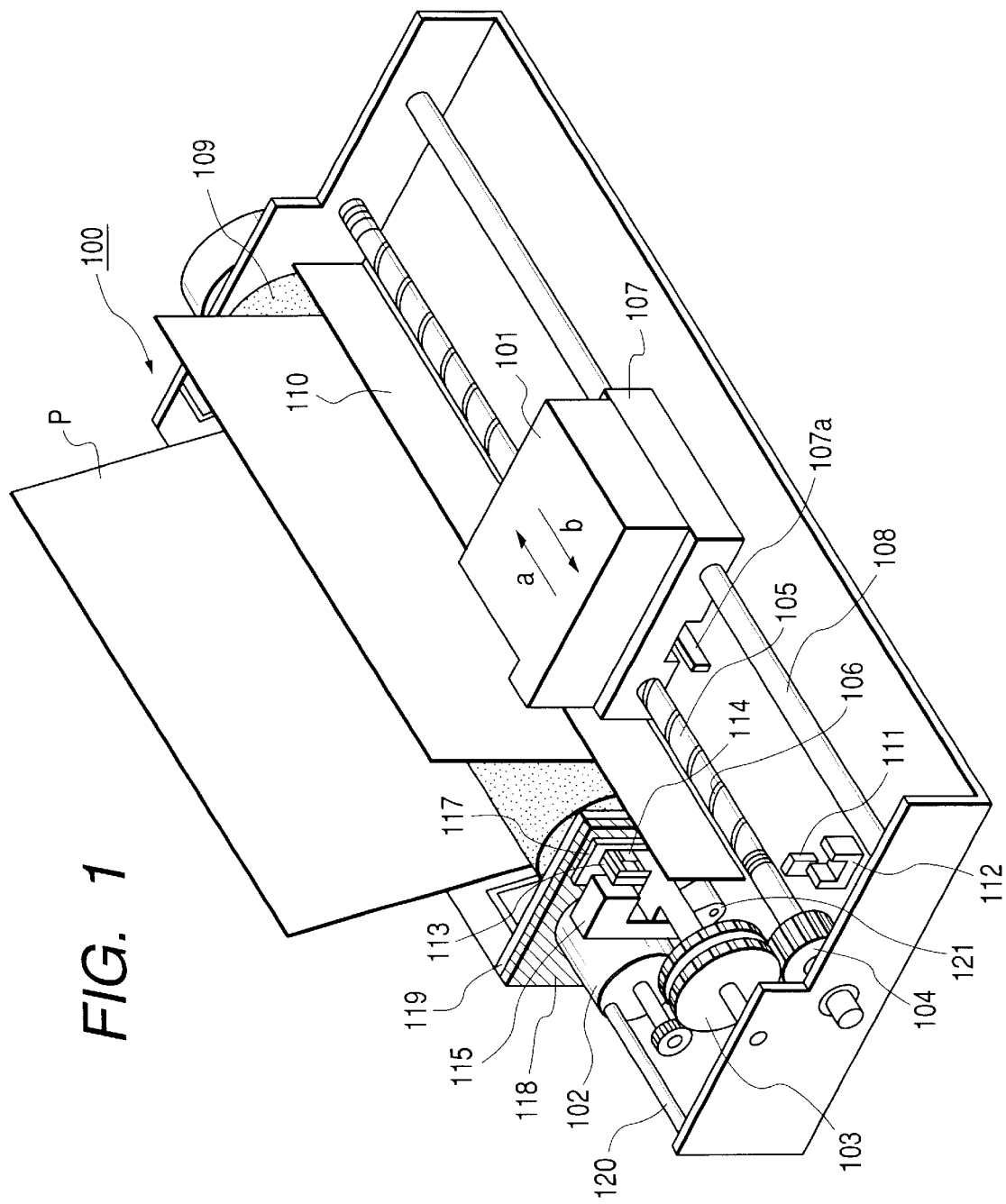
FIG. 1 is a schematic perspective view showing an example of an ink jet recording apparatus to which is applied a liquid discharge head of the present invention.

FIG. 1 is a schematic perspective view of an example of an ink jet recording apparatus to which is applied a liquid discharge head (hereinafter also referred to as the "recording head") of the present invention. This liquid discharge head is described in detail below.

In FIG. 1, reference numeral 101 indicates the ink jet recording head. This recording head 101 is mounted on a carriage 107 that is engaged with a spiral groove 106 of a lead screw 105. The lead screw 105 is rotated by forward and reverse rotation of a driving motor 102 through a driving power transmitters 103 and 104. With this construction, the ink jet recording head 101 is reciprocated together with the carriage 107 by the driving motor 102 along a guide 108 in the directions indicated by arrows a and b. A sheet pressing plate 110 presses a print sheet P (recording medium), which is transported on a platen 109 by a recording medium transporting apparatus (not shown), against the platen 109 along the moving direction of the carriage.

Photo-couplers 111 and 112 are provided in the vicinity of one end of the lead screw 105. These photo-couplers 111 and 112 function as home position detecting means for detecting the presence of a lever 107a of the carriage 107 in the area in which they are provided, thereby causing the switching of the rotational direction of the driving motor 102. In this drawing, numeral 113 denotes a support member that supports a cap member 114 covering a surface of the ink jet recording head 101 on which discharge ports are provided. Further, numeral 115 is an ink suction means for sucking an ink accumulated inside of the cap member 114 due to idle discharge from the head 101 or the like. The suction means 115 performs suction recovery for the head 101 through a cap internal opening 116. Numeral 117 indicates a cleaning wiper and numeral 118 indicates a moving member for moving the wiper 117, with the wiper 117 and the moving member 118 being supported by a body support member 119. The wiper 117 is not limited to this and may be another well-known cleaning wiper. Numeral 120 indicates a lever for starting suction in suction recovery operation. This lever 120 is moved by the motion of a cam 121 engaged with the carriage 107 and the transmission of the driving force of the driving motor 102 is controlled by a well-known transmission means such as a clutch switch. An ink jet recording control unit, which gives a signal to a heater (not shown) in the recording head 101 and performs driving control for each component described above, is provided in the body of the apparatus and is not shown in FIG. 1.

The ink jet recording apparatus 100 having the stated construction performs a recording operation for the print sheet P (recording medium), which is transported on the platen 109 by the recording medium transporting apparatus (not shown), by reciprocating the recording head 101 between both sides of the print sheet P.

<Construction of Liquid Discharge Head>

FIGS. 2A to 2F are each a cross sectional view of the liquid discharge head of the present invention taken in a direction of a liquid flow path. These drawings respectively show stages A to F of a characteristic phenomenon observed in the liquid flow path.

In this liquid discharge head a heater 52 for applying thermal energy to a liquid is provided on a smooth element substrate 51 as a discharge energy generating element for causing the discharge of the liquid. A liquid flow path 10 is formed on the element substrate 51 so as to correspond to the heater 52. The liquid flow path 10 is communicated with a discharge port 18 and with a common liquid chamber for supplying the liquid to a plurality of liquid flow paths 10. With this construction, the liquid flow path 10 receives, from the common liquid chamber 13, a liquid whose amount corresponds to the amount of a liquid discharged from the discharge port 18. Legend M represents a meniscus formed by a discharge liquid and the meniscus M is balanced in the vicinity of the discharge portion 18 by the internal pressure of the common liquid chamber 13 that is usually placed in a negative pressure state due to capillary attraction caused by the interior wall of the discharge port 18 and the liquid flow path 10 communicated with the discharge port 18.

The liquid flow path 10 is formed by joining the element substrate 51 provided with the heater 52 and a top board 50. Within the liquid flow path 10, a bubble generating area 11, in which bubbling is performed for the discharge liquid by the heater 52 that rapidly heats the liquid, is formed in the vicinity of an area in which the discharge liquid contacts the heater 52. Within the liquid flow path 10 including the bubble generating area 11, a movable member 31 is arranged so that at least a part thereof faces the heater 52. This movable member 31 includes a free end 32 on the downstream side that is close to the discharge port 18 and is supported by a support member 34 provided on the upstream side. In particular, in this embodiment, the free end 32 is arranged in the vicinity of the center of the bubble generating area 11 to suppress the growth of a bubble on the upstream side because such growth affects the back wave directed in the upstream direction and the inertial force of the liquid. Further, the movable member 31 can be displaced with reference to the support member 34 in accordance with the growth of a bubble generated in the bubble generating area 11. A fulcrum 33 of this displacement is a point where the movable member 31 is supported by the support member 34.

A stopper (regulating unit) 64 exists above the center of the bubble generating area 11. The stopper 64 regulates the displacement amount of the movable member 31 so as to fall within a certain range, thereby suppressing the growth of the bubble toward the upstream side. On the upstream side of the flow from the common liquid chamber 13 to the discharge port 18, that is, in a flow path section from the common liquid chamber 13 to the stopper 64, there exists a low resistance flow path area 65 in which the resistance applied by the liquid flow path is relatively low in comparison with a flow path section from the stopper 64 to the discharge port 18. In the low resistance flow path area 65, no upper wall exists or the area of the cross section of this flow path area is large, so that the resistance applied by the flow path to the movement of the liquid is small.

This construction allows the displaced movable member 31 to contact the stopper 64, so that the liquid flow path 10 including the bubble generating area 11 becomes a substantially closed space except for the section from the stopper 64 to the discharge port 18. The liquid discharge head of this embodiment has this characteristic construction.

Next, the discharge operation of the liquid discharge head of the present embodiment is described in detail.

Figure 2A:
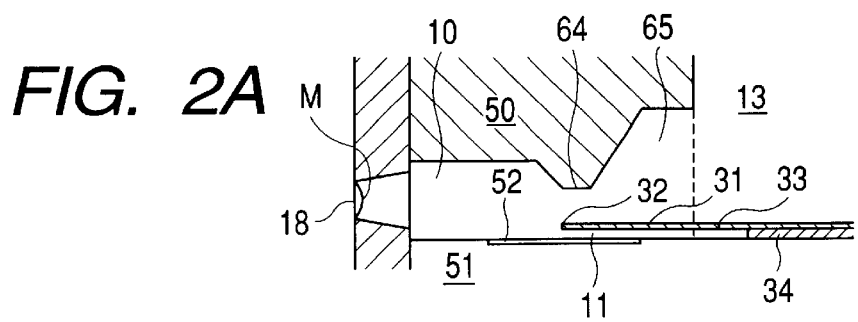
FIGS. 2A, 2B, 2C, 2D, 2E and 2F are each a cross sectional view of an embodiment of the liquid discharge head of the present invention taken in a direction of a liquid flow path, and respectively show stages A to F of a characteristic phenomenon observed in the liquid flow path.

FIG. 2A shows a state before energy, such as electric energy, is applied to the heater 52, that is, a state before the heater 52 generates heat. Especially note that the movable member 31 is positioned so as to face the upstream side of the bubble generated by the heating operation of the heater 52, and the stopper 64 that regulates the displacement amount of the movable member 31 is provided above the center of the bubble generating area 11. Because of this construction of the liquid flow path and the arrangement position of the movable member, the upstream side of the bubble is pressed downward by the movable member 31.

Figure 2B:
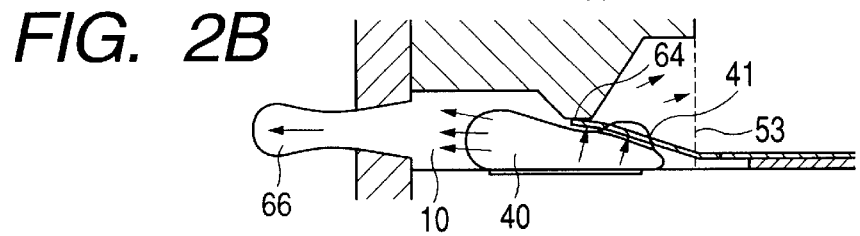

FIG. 2B shows a state where a part of the liquid filling the inside of the bubble generating area 11 is heated by the heater 52 and a bubble 40 caused by film boiling grows to around a maximum size. In this state, a pressure wave due to the generation of the bubble 40 propagates inside of the liquid flow path 10. By the propagation of the pressure wave, the liquid moves in both of the upstream direction and the downstream direction with reference to the center area of the bubble generating area. On the upstream side, the movable member 31 is displaced by the flow of the liquid caused by the growth of the bubble 40. On the downstream side, a discharge droplet 66 is in the process of being discharged from the discharge port 18. Here, the liquid on the upstream side greatly moves toward the common liquid chamber 13 due to the low resistance flow path area 65 in which the resistance applied by the flow path to the movement of the liquid is relatively low in comparison with the downstream side and therefore the liquid easily moves. However, if the movable member 31 is displaced so a to be close to or in contact with the stopper 64, the member 31 cannot be displaced any more. As a result, the movement of the liquid in the upstream direction is regulated. Further, the growth of the upstream side of the bubble 40 is regulated by the movable member 31. Consequently, there is obtained a maximum flow path resistance on the upstream side of the flow path from the bubble generating area to the common liquid chamber and the growth of the upstream side of the bubble becomes substantially uniform. This construction stabilizes the formation of discharge droplets and improves characteristics that depend on a response frequency.

Further, during this process, the movement force of the liquid in the upstream direction is great, so that the movable member 31 receives a great stress that pulls the member in the upstream direction. Further, the upstream side of the bubble 40 whose growth is regulated by the movable member 31 passes through small gaps between the side walls of the liquid flow path 10 and side portions of the movable member 31 and protrudes toward the upper surface of the movable member 31. This protruding bubble is hereinafter referred to as the "protrusion bubble (41)" in this specification.

In this state, the section of the liquid flow path from the movable member 31 to the discharge port has a shape where the path is narrow on the upstream side and is gradually widened toward the downstream side.

In this embodiment, the section of the flow path between the downstream side of the bubble 40 and the discharge port is placed in a "straight communication state" in which the section has a straight construction with reference to the liquid flow. It is more preferable that the propagation direction of the pressure wave caused by the generation of the bubble, the direction of the liquid flow caused by the pressure wave propagation, and a discharge direction are placed on the same straight line. In this case, an ideal state can be obtained where discharge states, such as the discharge direction and discharge speed of the discharge droplet 66, are stabilized at extremely high levels. With the present invention, to obtain this ideal state or a state that is closely analogous to the ideal state, the discharge port 18 and the heater 52 (in particular, the discharge port side (downstream side) of the heater that affects the discharge port side of the bubble) are directly connected with a straight line. As a result, if there is no liquid exists in the flow path, the heater (in particular, the downstream side of the heater) can be observed from the outside through the discharge port.

Meanwhile, as described above, the displacement amount of the movable member 31 is regulated by the stopper 64, so that the upstream side of the bubble 40 has a small size and maintains a state where the movable member 31 is bent upward by the inertial force of the liquid flowing in the upstream direction and a stress is applied to the movable member 31. In this state, the amount of liquid entering into the area on the upstream side is reduced to almost zero by the combination of the stopper, a liquid flow path dividing wall 53, the movable member 31, and the fulcrum 33. Note that the liquid is partially allowed to enter into the area as the protrusion bubble through the spaces of 10 $\mu$m or less between the movable member 31 and the liquid flow path dividing wall 53.

With this construction, the amount of the liquid flowing in the upstream direction is greatly reduced, thereby preventing a liquid crosstalk between adjacent nozzles, and a liquid back-flow and pressure vibration that occur in a supply path system and hinder a high-speed refill operation. This refill operation is described in detail later.

Figure 2C:
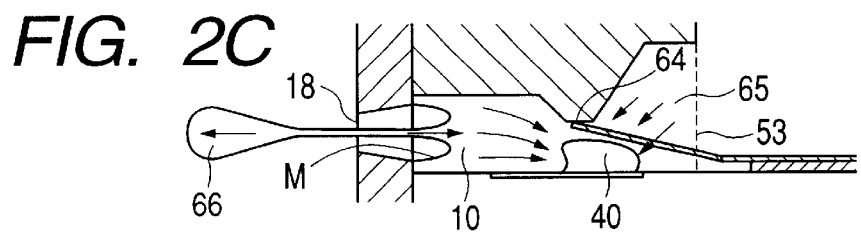

FIG. 2C shows a state where the bubble 40 starts to shrink because after the stated film boiling, the negative pressure in the bubble exceeds the movement force of the liquid within the liquid flow path in the downstream direction. At this point in time, the force of the liquid directed in the upstream direction due to the bubble growth is still great, so that the movable member 31 remains in contact with the stopper 64 for a certain time period after the start of the shrinkage of the bubble 40. As a result, the shrinkage of the bubble 40 mainly causes the movement force of the liquid in the upstream direction from the discharge port 18. In the state shown in FIG. 2B, the movable member 31 is bent upward and receives a stress. Consequently, in FIG. 2C, the movable member itself generates a force to release the stress, that is, a force for pulling back the liquid from the upstream side and for bending downward. As a result, from a certain point in time, the pull-back force generated by the movable member exceeds the stated movement force of the liquid in the upstream direction. As a result, the liquid starts to flow from the upstream side to the discharge port side, the bend degree of the movable member 31 is reduced, and a downward displacement of the movable member is started. That is, the balance between the upstream side and downstream side of the bubble 40 is lost and all of the liquid within the liquid flow path temporarily flows in the same direction toward the discharge port.

Immediately afterward, the movable member 31 that is still displaced remains in contact with the stopper 64 and the whole of the liquid flow path 10 including the bubble generating area 11, except for the discharge port 18, becomes a substantially closed space. Therefore, the shrinkage energy of the bubble 40 functions as a strong force for moving the liquid around the discharge port 18 in the upstream direction. As a result, at this point in time, the meniscus M is greatly pulled back from the discharge port 18 to the liquid flow path 10, thereby rapidly cutting the liquid column between the liquid in the path 10 and the discharge liquid droplet 66 with a strong force. Consequently, as shown in FIG. 2D, the number of droplets (satellites (sub-droplets) 67) that remain outside of the discharge port 18 is reduced.

Figure 2D:
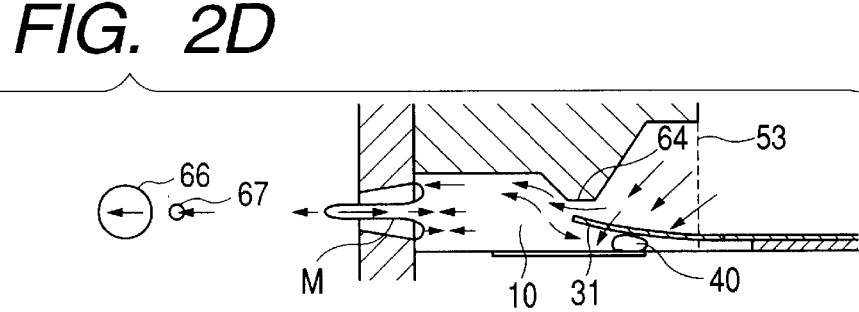

FIG. 2D shows a state where the bubble disappearance process is almost completed and the discharge liquid droplet 66 is divided from the meniscus M. In the low resistance flow path area 65, the combination of the repulsion force of the movable member 31 and the shrinkage force caused by the bubble disappearance of the bubble 40 exceeds the movement force of the liquid in the upstream direction. Consequently, the downward displacement of the movable member 31 and the liquid flow in the downstream direction in the low resistance flow path area 65 are started, so that the movable member 31 that is close to or contacts the stopper 64 start to go away from the stopper 64. Under this condition, because the liquid flow in the downstream direction in the low resistance flow path area 65 receives a low flow path resistance, the movement force of the liquid is rapidly increased and the liquid flows into the liquid flow path 10 through the stopper 64. Consequently, the force of the liquid flow that quickly pulls back the meniscus M toward the liquid flow path 10 is rapidly decreased. As a result, the liquid column portion of the meniscus M that remains outside of the discharge port 18 or protrudes in the discharge port 18 direction is retracted so that the number of satellites is reduced as much as possible. The liquid column portion of the meniscus M also starts to return to the position before the bubbling at a relatively low speed. In particular, an area in which a liquid flow speed becomes almost zero is formed between the discharge port 18 and the heater 52 by the merge of the returning flow of the meniscus M and the refill flow from the upstream side, thereby improving the convergence property of the meniscus. Although this feature is affected by the viscosity and surface tension of the ink, the present invention effectively avoids the degradation of image quality due to the satellites that have been divided from the liquid column and adhere to a recording medium, the adverse effect on the discharge direction by satellites adhering around an orifice, and the hindrance to proper discharge of inks by the satellites adhering around the orifice.

Further, the meniscus M itself starts to return before being pulled back into the liquid flow path with a strong force, so that the meniscus M returns to the flow path in a short time period even with a low liquid movement speed. Consequently, an overshoot of the meniscus, that is, the amount of the meniscus that does not stop at the discharge port 18 and protrudes outside of the discharge port 18 is reduced. As a result, a damping vibration phenomenon after the overshoot, in which the convergent point is the discharge port 18, is ended in a very short time period. This damping vibration phenomenon also adversely affects the printing quality, so that the present invention makes it possible to perform a stable printing operation at a high speed.

Further, the stated liquid flow to the liquid flow path 10 through the portion between the movable member 31 and the stopper 64 accelerates the flow speed near the wall surface of the top board 50, as shown in FIG. 2D. As a result, the number of minute bubbles remaining in this portion becomes very small and therefore the discharge operation is performed with stability.

On the other hand, some of satellites 67 existing right behind the discharge droplet 66 are positioned very close to the discharge droplet because the meniscus shown in FIG. 2C is rapidly pulled back. As a result, there occurs a phenomenon, the so-called slip stream phenomenon, where such satellites are pulled by the discharge droplet due to the eddy of the air occurring behind the flying discharge droplet 66.

This slip stream phenomenon is described in detail below. If a liquid droplet is discharged from a discharge port of a conventional liquid discharge head, the liquid droplet is not spherical in shape immediately after the discharge. That is, the liquid droplet is discharged to have a shape close to a liquid column where the tip portion thereof has a round shape. When a tail portion is pulled by both of a main droplet and meniscus and is divided from the meniscus, satellite dots are formed from the tail portion and fly along with the main droplet toward a recording target object. The satellite dots fly behind the main droplet and the discharge speed thereof is low because of being pulled by the meniscus, so that there occurs deviations in impingement position (dot placement position) between the main droplet and the satellite dots. This results in the degradation of printing quality. As described above, however, the liquid discharge head of the present invention draws the meniscus with a force that is stronger than that of the conventional liquid discharge head, so that the tail portion is pulled with a strong force after the discharge of the main droplet. This means that the tail portion is divided from the meniscus with a strong force at an early stage. Accordingly, the size of each satellite dot generated from the tail portion is reduced and the distance between the main droplet and the satellite dot is diminished. Further, because the tail portion is not pulled by the meniscus for a long time, the discharge speed is not reduced and the satellite 67 is pulled close to the discharge droplet 66 due to the slip stream phenomenon.

Figure 2E:
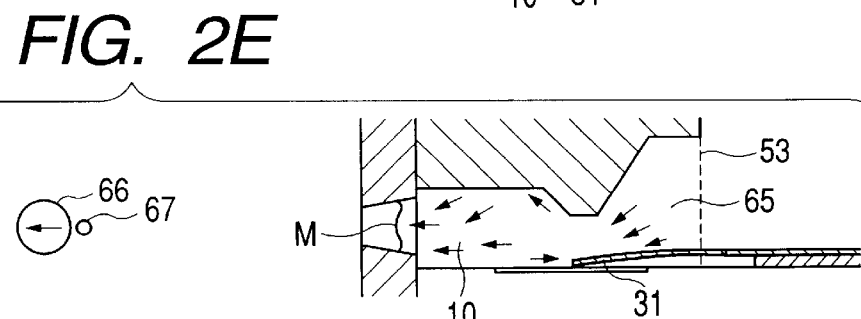
Figure 2E:

FIG. 2E shows an advanced state of the state shown in FIG. 2D. The satellite 67 is pulled close to the discharge droplet 66, so that the distance therebetween is further diminished, and the attractive force due to the slip stream phenomenon is increased. On the other hand, because the bubble disappearance process of the bubble 40 is completed and the movable member 31 is displaced so as to be positioned lower than the initial position due to a displacement overshoot, the liquid movement from the upstream side to the discharge port 18 produces a phenomenon where the liquid is drawn from the upstream side and is pushed in the discharge port 18 direction. Further, the cross-sectional area of a portion of the liquid flow path including the stopper 64 is large, so that the amount of the liquid flowing in the discharge portion 18 direction is increased and the meniscus M instantly returns to the discharge port 18. As a result, the refill characteristic is markedly improved in this embodiment.

Further, when there occurs cavitation due to the disappearance of the bubble, the movable member 31 is displaced downward and a bubble disappearance point is sectioned from the discharge port 18. Accordingly, a shock wave due to the cavitation is not directly transmitted to the discharge port 18 and a large portion thereof is absorbed by the movable member 31. This strongly suppresses the occurrence of minute liquid droplets (so-called microdots) from the meniscus that are generated when the shock wave due to the cavitation reaches the meniscus. This greatly reduces the possibility that image quality is degraded by microdots adhering to a printing medium or discharge becomes unstable due to microdots adhering around the discharge port 18.

Further, the position at which the cavitation due to the bubble disappearance occurs is shifted toward the fulcrum 33 by the movable member 31, which reduces damage to the heater 52. In addition, a thick ink existing between the movable member 31 and the heater 52 is forcedly expelled and eliminated from a space surrounded by the movable member 31 and the heater 52, thereby improving discharge durability. At the same time, because the thick ink is eliminated, less burned ink adhere to the heater in the surrounded space, thereby improving discharge stability.

Figure 2F:
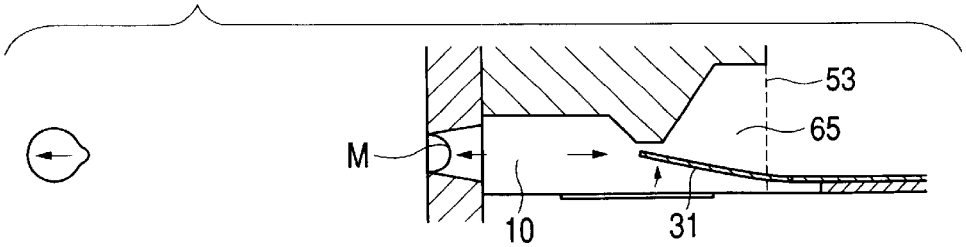

FIG. 2F shows a state where the state shown in FIG. 2E is advanced and the satellite 67 is absorbed into the discharge droplet 66. Even with any other construction, this absorption of the satellite 67 into the discharge droplet 66 does not necessarily occur each time a discharge operation is performed. That is, this absorption depends on certain conditions. However, at least by reducing the amount of satellites or eliminating them, the impingement positions of satellite dots hardly deviate from the impingement positions of main droplets on a recording target object, which greatly reduces the effect of the satellite dots on printing quality. That is, the sharpness of an image is increased, printing quality is improved, and detrimental effects of mist of satellite dots, such as stains on a printing medium or those inside of the recording apparatus, are reduced.

On the other hand, the movable member 31 is displaced toward the stopper 64 again in reaction to the overshoot. This displacement is converged by the damping vibration determined by the shape and Young's modulus of the movable member 31 and the viscosity and specific gravity of the liquid in the liquid flow path. Because of this convergence, the displacement of the movable member 31 finally stops at the initial position.

The flow of the liquid from the common liquid chamber 13 to the discharge port 18 is controlled by the upward displacement of the movable member 31 and the motion of the meniscus M is quickly converged in the vicinity of the discharge port. As a result, causes of the instability of a discharge state and the degradation of printing quality, such as the overshoot phenomenon of the meniscus, are greatly eliminated.

It should be noted here that the application of the present invention is not limited to the aforementioned liquid discharge head. For instance, the present invention is applicable to a liquid discharge head having a construction where bubbles generated on a heater are communicated with the atmosphere through a discharge port, or a liquid discharge head using an electricity-mechanical energy converting element, such as a piezo element, as a discharge energy generating means.

<Ink>
(1) Blank Ink

For instance, carbon black is preferably used as a black pigment included in the black ink. The ink in which the carbon black is dispersed may be prepared using self-dispersing type carbon black or by adding a dispersing agent to the ink.

(Self-Dispersing type Carbon Black)

An example of the self-dispersing type carbon black is carbon black, to the surface of which at least one hydrophilic group (anionic group or cationic group) is bonded directly or through another atomic group as an ionic group. Such self-dispersing type carbon black reduces or eliminates the need for addition of any dispersing agent to the ink to disperse carbon black.

In the case of the carbon black, to the surface of which at least one anionic group is bonded directly or through another atomic group, examples of the hydrophilic group bonded to the surface thereof include —COO (M2), —SO$_3$ (M2), —PO$_3$H (M2), and —PO$_3$ (M2)$_2$, where "M2" is a hydrogen atom, alkali metal, ammonium, or organic ammonium. Anionically charged self-dispersing type carbon black with either —COO (M2) or —SO$_3$ (M2) bonded to the surface thereof is particularly preferably used for the present invention because its dispersibility in the ink is good. With respect to "M2" in the above-described hydrophilic groups, examples of the alkali metal include Li, Na, K, Rb, and Cs, and examples of the organic ammonium include methylammonium, dimethylammonium, trimethylammonium, ethylammonium, diethylammonium, triethylammonium, methanolammonium, dimethanolammonium, and trimethanolammonium. The ink of the present embodiment including the self-dispersing type carbon black, where M2 is ammonium or organic ammonium, further improves the water fastness of an recorded image and therefore is particularly preferably used in the present embodiment. The reason the water fastness is improved may be that when this ink is applied onto a recording medium, ammonium is dissolved and ammonia evaporates. Here, for instance, the self-dispersing type carbon black, where M2 is ammonium, is prepared by subjecting a self-dispersing type carbon black, where M2 is alkali metal, to an ion exchange method to convert M2 into ammonium. Alternatively, such a self-dispersing type carbon black is prepared by adding an acid to convert the carbon black into H type and then adding ammonium hydroxide to convert M2 into ammonium.

As to a method for preparing the anionically charged self-dispersing type carbon black, an example method for chemically bonding a —COONa group to the surface of carbon black is a method with which the carbon black is subjected to an oxidation treatment using a hydrochlorous acid soda.

Note that such various hydrophilic groups as mentioned above may be directly bonded to the surface of carbon black or be indirectly bonded thereto through another atomic group provided between the surface and the hydrophilic groups. Examples of the atomic group include linear or branched alkylene groups having 1 to 12 carbon atoms, a substituted or unsubstituted phenylene group, and a substituted or unsubstituted naphthylene group. Examples of substituent groups on the phenylene group and the naphthylene group include linear or branched alkylene groups having 1 to 6 carbon atoms. Specific examples of the combination of another atomic group and the hydrophilic group include —$C_2H_4$COOM (M2), —Ph—$SO_3$ (M2) and —Ph—COO (M2), where Ph is a phenyl group.

In the present invention, the self-dispersing type carbon black is not limited to one kind, and two or more kinds of such carbon black may be used in combination as a coloring material of the ink. The amount of the self-dispersing type carbon black to be added in the ink is preferably within the range of from 0.1 to 15% by weight, more preferably from 1 to 10% by weight based on the total weight of the ink. If the self-dispersing type carbon black is added within this range, its satisfactorily dispersed state can be retained in the ink. In addition to the self-dispersing type carbon black, a dye or the like may be added as a coloring material for the purpose of controlling the color tone of the ink.

(Ordinary Carbon black)

In addition to the self-dispersing type carbon black, ordinary carbon black can be used as the coloring material for the black ink. Examples of such ordinary carbon black include carbon black pigments, such as furnace black, lamp black, acetylene black, and channel black. Specific examples of the ordinary carbon black include Columbia Carbon's Raven 7000, Raven 5750, Raven 5250, Raven 5000ULTRA-, Raven 3500, Raven 2000, Raven 1500, Raven 1250, Raven 1200, Raven 1190ULTRA-II, Raven 1170, Raven 1255; Cabbot's Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, Valcan XC-72R; DEGUSSA'S Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A, Special Black 4; and Mitsubishi Chemical Industries' No. 25, No. 33, No. 40, No. 47, No. 52, No. 900, No. 2300, MCF-8B, MA600, MA7, MA8, MA100. However, the present invention is not limited to these carbon black and other well-known carbon black may also be used. Further, ferromagnetic particles (such as magnetite and ferrite), titanium black, and the like may be used as black pigments.

In the case where the stated ordinary carbon black is used as the coloring material for the black in, it is preferable that a dispersing agent is added to the ink to disperse the carbon black in an aqueous medium with stability. For instance, it is preferable to use a dispersing agent that has an ionic group and achieves stable dispersion of carbon black in the aqueous medium by the action of the ionic group. Specific examples of such a dispersing agent include styrene-acrylic acid copolymer, styrene-acrylic acid-alkyl acrylate ester copolymer, styrene-maleic acid copolymer, styrene-maleic acid-alkyl acrylate ester copolymer, styrene-methacrylic acid copolymer, styrene-methacrylic acid-alkyl acrylate ester copolymer, styrene-maleic acid half ester copolymer, vinylnaphthalene-acrylic acid copolymer, vinylnaphthalene-maleic acid copolymer, styrene-maleic anhydride-maleic acid half ester copolymer, and their salts. Among these, preferable dispersing agents have weight average molecular weights ranging from 1000 to 30000, and more preferable dispersing agents have weight average molecular weights ranging from 3000 to 15000.

(Salt Contained in Black Ink)

The existence of salt in the black ink prevents the drastic changes of image quality resulting from the types of recording media, and realizes stable formation of images having extremely high densities and high quality.

Further, because the black ink contains salt, even if a black area formed with only the black ink coexists with a black area formed with a combination of color inks and the black ink on the same document, there occurs no difference in black image density between these black areas. As a result, it becomes possible to form an image that does not cause a feeling of wrongness in the sense of sight.

It is preferable that the salt contained in the black ink of the present invention is prepared using at least one of (M1), $_2SO_4$, $CH_3$COO (M1), Ph—COO (M1), (M1) $NO_3$, (M1) Cl, (M1) Br, (M1) I, (M1) $_2SO_3$, and (M1) $_2CO_3$, where "M1" is alkali metal, ammonium, or organic ammonium, and Ph is a phenyl group. Examples of the alkali metal include Li, Na, K, Rb, and Cs, and examples of the organic ammonium include methylammonium, dimethylammonium, trimethylammonium, ethylammonium, diethylammonium, triethylammonium, methanolammonium, dimethanolammonium, trimethanolammonium, ethanolammonium, diethanolammonium, and triethanolammonium. Sulfate (potassium sulfate, for instance) and benzoate (benzoic acid ammonium, for instance), out of the salt described above, has a high affinity for the self-dispersing type carbon black. More specifically, the sulfate and benzoate exhibit superior solid-liquid separation characteristics when they adhere to recording media. Accordingly, the sulfate and benzoate make it possible to form ink-jet-recorded images having high quality on various types of recording media.

The amount of the coloring material (self-dispersing type carbon black, for instance) to be added in the black ink according to the present invention is preferably within the range of from 0.1 to 15% by weight, more preferably from 1 to 10% by weight based on the total weight of the ink. Further, the amount of the salt to be added in the ink is preferably within the range of from 0.05 to 10% by weight, more preferably from 0.1 to 5% by weight based on the total weight of the ink. If the coloring material and salt are added to the black ink within these ranges, the effect of the present invention is further enhanced.

(Aqueous Medium in Black Ink)

The aqueous medium contained in the black ink according to the present invention is, for instance, water or a mixed solvent of water and a water-soluble organic solvent. It is particularly preferred that the water-soluble organic solvent has an effect of preventing the drying of the ink. Specific examples of the water-soluble organic solvent include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and ketoalcohols such as acetone and diacetone alcohol; ethers such as tetrahydrofuran and dioxane; polyalkylene glycols such as polyethylene glycol and polypropylene glycol; alkylene glycols whose alkylene moiety has 2 to 6 carbon atoms, such as ethylene glycol, propylene glycol, butylene glycol, triethylene glycol, 1,2,6-hexanetriol, thiodiglycol, hexylene glycol, and diethylene glycol; lower alkyl ether acetates such as polyethylene glycol monomethyl ether acetate; lower alkyl ethers of polyhydric alcohols, such as glycerol, ethylene glycol monomethyl (or ethyl) ether, diethylene glycol monomethyl (or ethyl) ether, and triethylene glycol monomethyl (or ethyl) ether; polyhydric alcohols such as trimethylolpropane and trimethylolethane; N-methyl-2-pyrrolidone; 2-pyrrolidone; and 1,3-dimethyl-2-imidazolidinone. The water-soluble organic solvents mentioned above may be used either singly or in any combination thereof. With respect to the water, it is desirable to use deionized water.

No particular limitation is imposed on the content of such water-soluble organic solvents in the black ink according to the present invention. However, it is preferable that the amount of the water-soluble organic solvent in the black ink is within the range of from 3 to 50% by weight based on the total weight of the ink. Further, the amount of water contained in the ink is preferably within the range of from 50 to 95% by weight based on the total weight of the ink.

(Ink Property, in particular Ink-Jet Discharge Property and Penetration Property Exhibited for Recording Medium)

The black ink according to the present invention may be used as ink for writing utensils and ink jet recording. Ink jet recording methods include a recording method with which mechanical energy is applied to an ink to discharge liquid droplets, and a recording method with which thermal energy is applied to an ink to discharge liquid droplets by means of bubbling of the ink. The black ink according to the present invention is particularly suitable for these recording methods. When the black ink according to the present invention is used for ink jet recording, it is preferable for the ink to have such a property that it can be discharged from an ink jet head. From the viewpoint of dischargeability from the ink jet head, the ink according to the present invention may desirably be prepared so as to have, as its own physical property, a viscosity of 1 to 15 cps and a surface tension of 25 mN/m (dyne/cm) or more, and preferably a viscosity of 1 to 5 cps and a surface tension of 25 to 50 mN/m (dyne/cm).

The penetration property that an ink exhibits for a recording medium can be expressed by a Ka value obtained using a Bristow's method. That is, if the ink penetration property is expressed as an ink amount V per 1 m$^2$, the amount V (ml/m$^2$=$\mu$m) of an ink, which penetrates into the recording medium when a predetermined time period t has passed after the discharge of an ink droplet, is expressed by a Bristow's formula given below.

$$V = Vr + Ka\ (t-tw)^{1/2}$$

Here, immediately after the ink droplet adheres to the surface of the recording medium, most of the ink is absorbed by rough portions (uneven portions) on the recording medium surface and almost no ink penetrates into the recording medium. The time period in which the ink droplet remains in this state is referred to as a contact time (tw) and the amount V of the ink absorbed by the rough portions of the recording medium during this contact time is referred to as Vr. When the contact time has passed after the adhesion of the ink, the amount of the ink penetrated into the recording medium increases in accordance with how long time has passed after the contact time, that is, in proportion to the ½th power of (t−w). Ka is a proportional coefficient representing the increase in the penetrated ink, and indicates a value corresponding to a penetration speed. For instance, the Ka value is measurable using a dynamic penetration property testing device using the Bristow's method (such as the dynamic permeability tester S manufactured by Toyo-Seiki Manufacturing). To further improve the quality of images recorded using the stated ink according to the present invention, the Ka value is preferably set below 1.5, more preferably set at least equal to 0.2 but below 1.5. That is, if the Ka value is below 1.5, the solid-liquid separation occurs at an early stage of the penetration of the ink into the recording medium and therefore it becomes possible to form high-quality images where feathering is greatly reduced. Note that the recording medium used to obtain the Ka value with the Bristow's method is plain paper, such as PB paper used for copying machines or page printers (laser beam printers) using an electrophotography method or printers using an ink-jet recording method, or PPC paper used for copying machines using the electrophotography method. These paper is available from Canon Kabushiki Kaisha. Also, the measurement was made in an environment similar to an ordinary office environment where the temperature is in the range of from 20 to 25° C. and the humidity is in the range of from 40 to 60%.

To obtain the stated properties, it is preferable that the aqueous medium includes, for instance, glycerin, trimethylolpropane, thiodiglycol, ethylene glycol, diethylene glycol, isopropyl alcohol, and acetylene alcohol.

(2) Color Ink

The coloring materials used for color inks according to the present invention are selected from well-known dyes and pigments. The usable dyes include acid dyes and direct dyes. For instance, usable anionic dyes include already-existing ones and newly produced ones as long as they have appropriate color tones and densities. Also, any of these dyes may be mixed and used as the coloring materials.

Specific examples of the anionic dyes are listed below.

(1) The coloring materials for yellow include C.I. Direct Yellow 8, 11, 12, 27, 28, 33, 39, 44, 50, 58, 85, 86, 87, 88, 89, 98, 100, 110, 132; C.I. Acid Yellow 1, 3, 7, 11, 17, 23, 25, 29, 36, 38, 40, 42, 44, 76, 98, 99; C.I. Reactive Yellow 2, 3, 17, 25, 37, 42; and C.I. Food Yellow 3.

(2) The coloring materials for red include C.I. Direct Red 2, 4, 9, 11, 20, 23, 24, 31, 39, 46, 62, 75, 79, 80, 83, 89, 95, 197, 201, 218, 220, 224, 225, 226, 227, 228, 229, 230; C.I. Acid Red 6, 8, 9, 13, 14, 18, 26, 27, 32, 35, 42, 51, 52, 80, 83, 87, 89, 92, 106, 114, 115, 133, 134, 145, 158, 198, 249, 265, 289; C.I. Reactive Red 7, 12, 13, 15, 17, 20, 23, 24, 31, 42, 45, 46, 59; and C.I. Food Red 87, 92, 94.

(3) The coloring materials for blue include C.I. Direct Blue 1, 15, 22, 25, 41, 76, 77, 80, 86, 90, 98, 106, 108, 120, 158, 163, 168, 199, 226; C.I. Acid Blue 1, 7, 9, 15, 22, 23, 25, 29, 40, 43, 59, 62, 74, 78, 80, 90, 100, 102, 104, 117, 127, 138, 158, 161; and C.I. Reactive Blue 4, 5, 7, 13, 14, 15, 18, 19, 21, 26, 27, 29, 32, 38, 40, 44, 100.

(4) The coloring materials for black include C.I. Direct Black 17, 19, 22, 31, 32, 51, 62, 71, 74, 112, 113, 154, 168, 195; C.I. Acid Black 2, 48, 51, 52, 110, 115, 156; and C.I. Food Black 1, 2.

(Solvent)

The ink solvent or dispersing agent including the stated coloring materials for color inks is, for instance, water or a mixed solvent of water and a water-soluble organic solvent. Specific examples of the water-soluble organic solvent are the same as those for the black ink. Also, if an ink-jet method (bubble jet method, for instance) is used to have the color inks adhere to a recording medium, it is preferable that the inks are prepared so as to have desired viscosities and surface tensions. In this case, the color inks take on excellent ink jet discharge properties.

(Amount of Coloring Material to be Added)

In the case of ink jet recording, the amount of the coloring material to be added in each color ink described above may be appropriately determined so that they have excellent ink jet discharge properties, and desired color tone and density. As a measure, for instance, it is preferable that the amount of the coloring material to be added is within the range of from 3 to 50% by weight based on the total weight of the ink. Also, if importance is placed on the evenness of black images in the sense of sight, it is particularly preferable that the concentration of a dye in each color ink is set below 10% by weight based on the total weight of the color ink, as described above. Also, it is preferable that the amount of water contained in each color ink is set within the range from 50 to 95% by weight based on the total weight of the ink.

(Penetration Property of Color Ink)

It is preferable that the color inks described above have a Ka value that is at least equal to 5 because it becomes possible to form high-quality color images on recording media. More specifically, the inks having such a Ka value exhibit a high penetration property for a recording medium, so that even if images in at least two colors, out of yellow, magenta, and cyan, are recorded adjacent to each other, for instance, color bleeding at boundaries between these images is suppressed. Also, even if an image in a second order color is formed by overlaying images in these color inks, bleeding occurring at boundaries between adjacent images in different colors is effectively suppressed because the inks have a high penetration property. The color ink having such a Ka value are prepared using a conventional method with which, for instance, a surface active agent or a permeable solvent, such as glycol ether, is added to the ink. Needless to say, the amount of the added surface active agent or permeable solvent is determined as appropriate.

Next, the inks prepared in this embodiment are described. Note that all designations of "part" or "parts" and "%" as will be used in the following description mean part or parts by weight and % by weight unless otherwise noted.

First, the preparation of dye dispersing element 1 is described.

(Dye Dispersing Element 1)

10 g of carbon black having a surface area of 230 m$^2$/g and a DBP oil absorption of 70 ml/100 g, and 3.41 g of p-amino-N-benzoic acid were well mixed with 72 g of water, and then 1.62 g of nitric acid was added dropwise to the resultant mixture, followed by agitation at 70° C. Several minutes after, a solution obtained by dissolving 1.07 g of sodium nitrite in 5 g of water was added to the mixture, followed by further agitation for 1 hour. The resultant slurry was filtered with a filter (Toyo filter No. 2 manufactured by Advantes Co., Ltd.), and pigment particles were well washed with water, and then dried in an oven at 90° C. To the pigment was added water to prepare an aqueous pigment solution containing 10% by weight of pigment. By the above-described method, the hydrophilic group shown by the following chemical formula was introduced to the surfaces of carbon black particles.

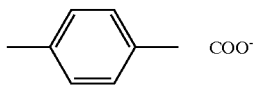

Next, a black ink 1 having the following composition was prepared using the stated dye dispersing element 1.

| (Black Ink 1) | |
|---|---|
| dye dispersing element 1 | 30 parts |
| benzoic acid ammonium | 1 part |
| trimethylolpropane | 6 parts |
| glycerin | 6 parts |
| diethylene glycol | 6 parts |

| -continued | |
|---|---|
| (Black Ink 1) | |
| acetylene glycol ethylene oxide additive (acetylenol EH (product name) manufactured by Kawaken Fine Chemical Co.,Ltd.) | 0.2 parts |
| water | balance |

The black ink prepared in this manner has a construction where the aforementioned hydrophilic group is introduced to the surfaces of carbon black particles that are a black coloring material, so that the black coloring material has a high dispersibility. If this black ink is mixed with a reactive color ink containing a reaction agent made of a metal ion to be described later, the hydrophilic group of the black coloring material reacts with the metal ion, so that the black coloring material precipitates. This prevents a situation where the black coloring material moves to a print area that is formed with a non-reactive color ink and is adjacent to a print area formed with the black ink. As a result, bleeding occurring at the boundaries between a print area formed with the black ink and an adjacent print area formed with a non-reactive color ink is suppressed.

The color ink in each color (yellow ink 1, magenta ink 1, cyan ink 1) was prepared by mixing the following components, thoroughly stirring the mixture to dissolve the components in water, and filtering the resultant solution under pressure through a microfilter (product of Fuji Photo Film Co., Ltd.) having a pore size of 3.0 μm.

| (Yellow Ink 1) | |
|---|---|
| acetylene glycol ethylene oxide additive (acetylenol EH (product name) manufactured by Kawaken Fine Chemical Co.,Ltd.) | 1.0 part |
| trimethylolpropane | 6 parts |
| glycerin | 6 parts |
| 2-pyrolidone | 6 parts |
| CI acid yellow 23 | 3 parts |
| water | balance |
| (Magenta Ink 1) | |
| acetylene glycol ethylene oxide additive (acetylenol EH (product name) manufactured by Kawaken Fine Chemical Co.,Ltd.) | 1.0 part |
| trimethylolpropane | 6 parts |
| glycerin | 6 parts |
| 2-pyrolidone | 6 parts |
| CI acid red 52 | 3 parts |
| water | balance |
| (Cyan Ink 1) | |
| acetylene glycol ethylene oxide additive (acetylenol EH (product name) manufactured by Kawaken Fine Chemical Co.,Ltd.) | 1.0 part |
| trimethylolpropane | 6 parts |
| glycerin | 6 parts |
| 2-pyrolidone | 6 parts |
| CI acid blue 9 | 3 parts |
| water | balance |

Magnesium nitrate, whose amount is shown in Table 1 below, is added to each of the yellow ink 1, magenta ink 1, and cyan ink 1 described above to prepare yellow ink 2, magenta ink 2, and cyan inks 2 to 5. Note that the amount of water is adjusted in accordance with the amount of the added magnesium nitrate to prevent a situation where the concentrations of other components are shifted from those of the components in the original inks 1.

TABLE 1

| | Amount of Added Mg Nitrate | Metal Ion Concentration |
|---|---|---|
| Yellow Ink 2 | 0.30% | 0.049% |
| Magenta Ink 2 | 0.30% | 0.049% |
| Cyan Ink 2 | 0.15% | 0.025% |
| Cyan Ink 3 | 0.30% | 0.049% |
| Cyan Ink 4 | 0.45% | 0.074% |
| Cyan Ink 5 | 0.60% | 0.098% |

It should be noted here that in this embodiment, magnesium nitrate is used as a metal salt added to the reactive color ink, thereby fusing a divalent magnesium ion ($Mg^{2+}$) as a metal ion in the reactive color ink. However, the metal ion fused in the reactive color ink is not limited to this and may be at least one polyvalent metal cation selected from a group consisting of $Ca^{2+}$, $Cu^{2+}$, $Co^{2+}$, $Ni^{2+}$, $Fe^{2+}$, $La^{3+}$, $Nd^{3+}$, $Y^{3+}$, $Al^{3+}$.

Also, in the above description, the reactive color ink contains 0.30% by weight or 0.45% by weight of a metal salt (magnesium nitrate), although it is enough that the concentration of the metal salt in the reactive color ink is within the range of 0.1 to 15% by weight.

Next, ink sets 1 to 6 shown in Table 2 below are prepared by combining the inks described above in various ways.

TABLE 2

| | Black | Cyan | Magenta | Yellow |
|---|---|---|---|---|
| Ink Set 1 | Black Ink 1 | Cyan Ink 2 | Magenta Ink 1 | Yellow Ink 1 |
| Ink Set 2 | Black Ink 1 | Cyan Ink 3 | Magenta Ink 1 | Yellow Ink 1 |
| Ink Set 3 | Black Ink 1 | Cyan Ink 4 | Magenta Ink 1 | Yellow Ink 1 |
| Ink Set 4 | Black Ink 1 | Cyan Ink 5 | Magenta Ink 1 | Yellow Ink 1 |
| Ink Set 5 | Black Ink 1 | Cyan Ink 3 | Magenta Ink 2 | Yellow Ink 1 |
| Ink Set 6 | Black Ink 1 | Cyan Ink 3 | Magenta Ink 2 | Yellow Ink 2 |

Then, these ink sets are set in a printer produced by modifying an ink jet printer (BJF800) manufactured by Canon Kabushiki Kaisha, and images subjected to evaluation are recorded on recording sheets using this printer. When doing so, the discharge density of the black ink is set at 600×600 dpi and the discharge amount of one liquid droplet thereof is set at 30 ng. Also, the discharge density of each color ink is set at 1200×600 dpi and the discharge amount of one liquid droplet thereof is set at 6.5 ng. In this manner, image recording was performed.

The following description concerns the results of evaluation of the images for evaluation formed in this manner.

(1) Evaluation Result Concerning Bleeding and White Haze <Part 1>

Figure 3:
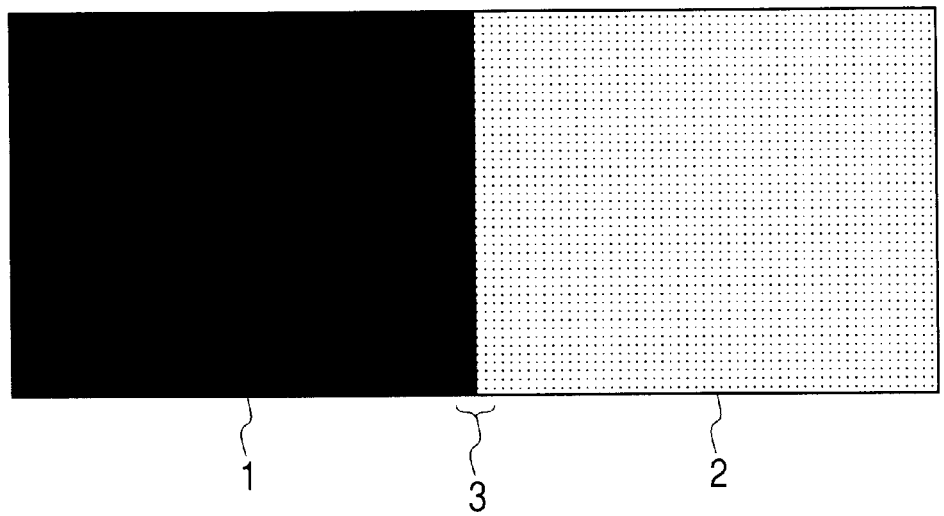
FIG. 3 shows a print pattern including a black filled-in area and a color filled-in area recorded on a recording sheet.

The print pattern shown in FIG. 3 was formed on recording sheets using the ink sets 1 to 4. In FIG. 3, the print pattern includes a black filled-in area 1 (area in which the print duty of the black ink is 100%) and a color filled-in area 2 (area in which the print duty of color inks is 100%). Then, the degrees of bleeding and white haze occurring at the boundary portion 3 between the black print area 1 and the color print area 2 were evaluated. When doing so, the print duty of the cyan ink was changed in three steps (10%, 15%, and 20%). The cyan ink was underprinted in the black print area 1 and an area surrounding the black print area 1, with the distance between the edge of the black print area 1 and the outer edge of the surrounding area being up to four pixels. That is, images subjected to evaluation were formed according to 12 combinations of conditions where the print duty of the cyan ink in each of the 4 ink sets was changed in three steps respectively.

Also, this evaluation was made using, as the recording sheets, various types of plain paper distributed worldwide, such as PB paper manufactured by Canon Kabushiki Kaisha, Brilliant White Paper manufactured by Canon Kabushiki Kaisha, Union Camp's Great White Inkjet, Hammermill's Jet Print, Xerox's Xerox 4024, Hewlett Packard's Bright White Inkjet Paper, and Aussdat Rey's Rey Jet. Images were printed on these papers according to each combination of evaluation conditions. Then, evaluation was made using, as a sample, the recording sheet evaluated as having the lowest quality level among recording sheets based on each condition combination.

Note that the evaluation was made according to the following evaluation criteria.

C: a level where both of bleeding and white haze are conspicuous

B: a level where one of bleeding and white haze or both of them is slightly conspicuous A: a level where both of bleeding and white haze are almost inconspicuous and there is no problem from a practical standpoint AA: a level where both of bleeding and white haze are inconspicuous The evaluation results are shown in Table 3 below.

TABLE 3

| | Ink Set | | | |
|---|---|---|---|---|
| | 1 | 2 | 3 | 4 |
| 10% | B | B | B | A |
| 15% | B | A | A | A |
| 20% | B | A | AA | AA |

Under these print conditions, the metal ion concentration (% by weight) in the ink underprinted in the black print area and surrounding area having a width of up to four pixels is multiplied by the print duty (%) of the ink underprinted in the black print area and the surrounding area. From the results of this multiplication, it has been found that a value at least equal to 0.01 need to be obtained from this calculation to obtain an evaluation result at the "A" level.

Similarly, under the aforementioned print conditions, the application amount per unit area of the metal ion that should be underprinted in the black print area and the surrounding area is calculated, and it has been found that an application amount that is at least equal to 0.1 ng/mm² is required to obtain an evaluation result at the "A" level.

Here, the black print area and the surrounding area are areas in which the metal ion becomes effective at promoting the reaction between the black ink and the reactive color ink. Therefore, by applying the reactive color ink to the black print area and the surrounding area (that is, a peripheral area having a width of 0 to 4 pixels), even if the reactive color ink is applied in an area that is slightly displaced from the black print area 1, the underprinted reactive color ink achieves an effect of preventing bleeding and white haze.

(2) Evaluation Result Concerning Bleeding and White Haze <Part 2>

As shown in Table 4 below, another evaluation was made using the ink sets 2, 5, and 6 according to the same evaluation method and evaluation criteria as in the above evaluation. For this evaluation, print conditions 1 to 5 were set by changing the print duty of each color ink in each ink set.

TABLE 4

| | Ink Set | Cyan Ink | Magenta Ink | Yellow Ink |
|---|---|---|---|---|
| Condition 1 | 2 | 15% | 0% | 0% |
| Condition 2 | 5 | 5% | 5% | 0% |
| Condition 3 | 5 | 7.5% | 7.5% | 5% |
| Condition 4 | 6 | 2.5% | 2.5% | 2.5% |
| Condition 5 | 6 | 5% | 5% | 5% |

Evaluation results are shown in Table 5 below.

TABLE 5

| | Evaluation Result |
|---|---|
| Condition 1 | A |
| Condition 2 | B |
| Condition 3 | A |
| Condition 4 | B |
| Condition 5 | A |

Like in the case described above, under these print conditions, the metal ion concentration (% by weight) in the ink underprinted in the black print area and the surrounding area having a width of up to four pixels is multiplied by the print duty (%) of the ink underprinted in the black print area and the surrounding area. From the results of this multiplication, it has been found that a multiplication result that is at least equal to 0.01 is required to obtain the "A" evaluation result.

Also, similarly, under the aforementioned print conditions, the application amount per unit area of the metal ion that should be underprinted in the black print area and the surrounding area is calculated, and it has been found that an application amount that is at least equal to 0.1 ng/mm$^2$ is required to obtain the evaluation result at the "A" level.

Figure 4:
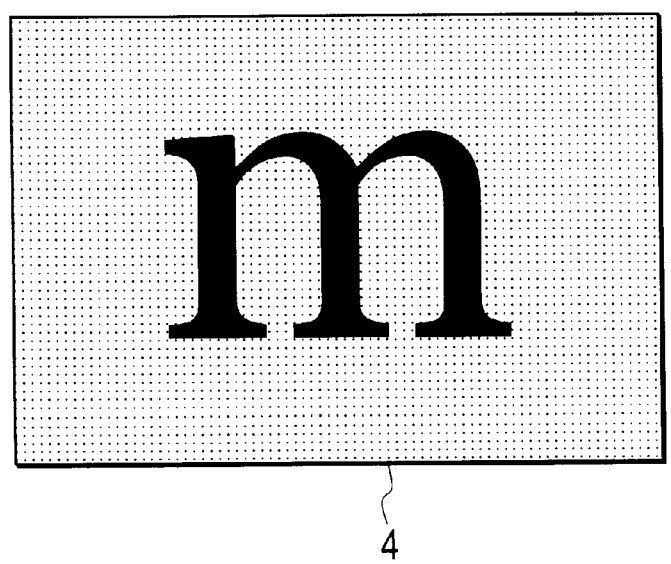
FIG. 4 shows an image subjected to evaluation where a character in black is printed in a yellow filled-in area.

(3) Evaluation of Bleeding of Underprinted Ink and Change of Color Tone in Black Print Area As shown in FIG. 4, images subjected to evaluation were formed with the ink set 2 described above by printing a character in black within a yellow filled-in area 4 (a print area in which the print duty of the yellow ink is 100%). For this evaluation, the print duty of each color ink to be underprinted in the black print area (the portion of the black character) is changed as indicated by print conditions 1 to 3 shown in Table 6 below.

TABLE 6

| | Black Ink 1 | Cyan Ink 3 | Magenta Ink | Yellow Ink 1 |
|---|---|---|---|---|
| Condition 1 | 100% | 15% | 0% | 0% |
| Condition 2 | 100% | 15% | 10% | 5% |
| Condition 3 | 80% | 15% | 10% | 5% |

Also, by intentionally changing the amount of deviation in impingement position between liquid droplets of the black ink and liquid droplets of the color inks on recording sheets, images subjected to evaluation were formed. An evaluation was made for image degradation in the yellow filled-in area 4 caused by the spread of the ink underprinted in the black print area to the yellow filled-in area 4. During printing, the impingement positions of droplets of the underprinted color ink were shifted from the black print area in the range of from 0 to 6 pixels in each of the main scanning direction and sub-scanning direction, thereby having the print area of the underprinted color ink extend outside of the black print area.

Here, the shift amount of one pixel was set to a distance between two adjacent dots in the case where the discharge density is set to 1200×600 dpi in a color printing mode. Also, among images formed under each condition, an image having the lowest image quality at the boundary between the black print area and the yellow print area in the main scanning direction and the sub-scanning direction was used as an evaluation sample.

The criteria used to evaluate the image degradation in the yellow filled-in area 4 due to the spread of the ink underprinted in the black print area to the yellow filled-in area 4 are as follows:

C: a level where a large amount of the underprinted ink spreads to the yellow filled-in area and the color of the yellow filled-in area is partially changed;

A: a level where a slight amount of the underprinted ink spreads to the yellow filled-in area but the color of the yellow filled-in area is not changed and therefore there is no problem from a practical standpoint; and AA: a level where any portion of the underprinted ink does not spread to the yellow filled-in area.

Also, an evaluation was made for the color tone of the black filled-in area (the portion of the black character) according to the following evaluation criteria:

C: a level where the black character portion is tinged; and

A: a level where the black character portion is almost monotone

The evaluation results are shown in Table 7 below.

TABLE 7

| | Deviation Amount Concerning Impingement Position | | | | Color Tone in Black |
|---|---|---|---|---|---|
| | 0 pixel | 2 pixels | 4 pixels | 6 pixels | Print Area |
| Condition 1 | C | C | C | C | C |
| Condition 2 | AA | A | A | C | A |
| Condition 3 | AA | A | A | C | A |

From these evaluation results, it has been found that if, in addition to the reactive color ink (cyan ink 3) for underprinting that has mutual reactivity with the black ink, other non-reactive color inks (magenta ink 1 and yellow ink 1) that do not have reactivity with the black ink are applied to the black print area, it becomes possible to suppress the change of the color tone in the black print area caused by the reactive color ink.

It should be noted here that in the above description, each ink set includes a cyan ink, a magenta ink, and a yellow ink, and the change of black color tone is suppressed by applying and overlaying these three color inks on each other. However, any combination of color inks may be used so long as black color can be obtained by overlaying the color inks. For instance, in the case of an ink set that includes a red ink as well as the stated color inks, it becomes possible to suppress the change of the black color tone by overlaying the red ink on the cyan ink. As is apparent from this, it becomes possible to suppress the change of the black color tone by merely applying and overlaying at least one non-reactive color ink, which is capable of suppressing the change of the black color tone, on the color ink having mutual reactivity.

It has also been found that if the print area formed with the color ink for underprinting extends outside the black print area by four pixels or less, the underprinted ink rarely spreads to the yellow filled-in area 4, so that there rarely occurs image degradation in the yellow filled-in area.

(4) Evaluation Result Concerning Bleeding and White Haze <Part 3>

There was made a further elaborate investigation as to bleeding and white haze occurring when underprinting was performed by applying a color ink having no mutual reactivity with the black ink described above as well as a color ink having such mutual reactivity.

Underprinting was performed by applying a color ink having no mutual reactivity with the black ink along with a color ink having such mutual reactivity according to conditions 10 to 15 shown in Table 8 below. Table 8 gives various combinations of ink sets and the recording duty of each ink in the black print area.

TABLE 8

|  | Ink Set | Cyan Ink | Magenta Ink | Yellow Ink |
| --- | --- | --- | --- | --- |
| Condition 10 | 4 | 10% | 5% | 5% |
| Condition 11 | 4 | 10% | 10% | 10% |
| Condition 12 | 4 | 10% | 15% | 15% |
| Condition 13 | 5 | 10% | 5% | 20% |
| Condition 14 | 5 | 10% | 5% | 30% |
| Condition 15 | 5 | 10% | 5% | 40% |

Under these conditions where the recording duty of each ink in each ink set is changed for the black print area, the evaluation was made using the same recording method, evaluation method, and evaluation criteria as those described in the section "(1) Evaluation Result Concerning Bleeding and White Haze <Part 1>" of this specification.

Table 9 below shows the evaluation result and ink shot-in total amount ratio (the total shot-in amount of a color ink containing a metal ion:the total shot-in amount of color inks containing no metal ion) of the underprinting performed for the black print area under each condition.

TABLE 9

|  | Evaluation Result | Total Shot-in Amount of Color Ink Containing Metal Ion ↑ Total Shot-in Amount of Color Ink Containing No Metal Ion |
| --- | --- | --- |
| Condition 10 | A | 1:1 |
| Condition 11 | A | 1:2 |
| Condition 12 | B | 1:3 |
| Condition 13 | A | 1:1.3 |
| Condition 14 | A | 1:2 |
| Condition 15 | B | 1:2.7 |

From the evaluation results shown above, it has been found that if underprinting is performed by applying a color ink having no mutual reactivity with the black ink as well as a color ink having such mutual reactivity, the relation between "the total shot-in amount of a color ink containing a metal ion in a black print area" and "the total shot-in amount of a color ink containing no metal ion in the black print area" affects bleeding and white haze. Further, it has been found that to obtain a favorable state concerning bleeding and white haze (to obtain an evaluation result at the "A" level), "the total shot-in amount of a color ink containing a metal ion in a black print area" needs to be at least equal to 50% of "the total shot-in amount of a color ink containing no metal ion in the black print area".

Further, as to the "color ink containing no metal ion" in the above description, general inks in which materials containing small amounts of metal ions have been added for pH control are also regarded as the color ink containing no metal ion. This is because the acceleration of dispersion destruction of black ink pigments does not become a significant level even if a small amount of metal salt has been added for pH control with a well-known technique. Therefore, for ease of explanation, in the above description, such inks in which materials containing small amounts of metal ions have been added for pH control are also referred to as the color ink containing no metal ion.

As can be seen from the evaluation results shown above, the metal ion concentration in each link described in the prior art is not a main control factor. More specifically, it has been newly found that the black print area includes an area in which the metal ion becomes effect at promoting the reaction between the black ink and the reactive color ink and the amount of metal ion applied to this area is a substantial control factor from the viewpoint of image formation. Further, it has been newly found that if underprinting is performed by applying a color ink having no mutual reactivity with the black ink as well as a color ink having such mutual reactivity, the relation between the total shot-in amount of the underprinted color ink containing a metal ion and the total shot-in amount of the color ink containing no metal ion is a substantial control factor from the viewpoint of image formation.

As described above, an ink jet recording method of the present invention achieves the effect of preventing bleeding and white haze occurring at the boundary between a black print area and an adjacent print area formed with a non-reactive color ink. To achieve this effect, with this ink jet recording method, a value at least equal to 0.01 is obtained from a calculation where (the metal ion concentration (% by weight) in a reactive color ink applied in an area in which a metal ion becomes effect at promoting the reaction between a black ink and the reactive color ink) is multiplied by (the print duty (%) of the reactive color ink applied in the area in which the metal ion becomes effect at promoting the reaction between the black ink and the reactive color ink). Further, to prevent bleeding and white haze, the application amount per unit area of a metal ion applied in the area, in which the metal ion becomes effect at promoting the reaction between the black ink and the reactive color ink, is set at 0.1 ng/mm$^2$ or larger.

Further, another ink jet recording method of the present invention further includes a step for applying at least one non-reactive color ink in at least the black ink print area. Because the non-reactive color ink is also applied in the black print area with this method, the change of black color tone in this black print area is suppressed.

What is claimed is:

1. An ink jet recording method that uses an ink set including a black ink and a plurality of color inks, at least one of the plurality of color inks containing a metal ion and being a reactive color ink that exhibits mutual reactivity with the black ink, each color ink other than the at least one reactive color ink being a non-reactive color ink that exhibits non-reactivity with the black ink, the ink jet recording method comprising:

a step for applying the at least one reactive color ink in an area in which the metal ion becomes effective at promoting a reaction between the black ink and the at least one reactive color ink, wherein the at least one reactive color ink is applied in the area so that a value at least equal to 0.01 is obtained from a calculation where the metal ion concentration percentage by weight in the at least one reactive color ink applied in the area is multiplied by a print duty percentage of the at least one reactive color ink applied in the area.

2. An ink jet recording method according to claim 1, wherein the black ink contains salt land uses a black pigment as a coloring material.

3. An ink jet recording method according to claim 1, wherein a total application amount of the at least one reactive color ink applied in the area is at least equal to 50% of a total application amount of each non-reactive color ink applied in the area.

4. An ink jet recording method according to claim 1, wherein the print duty of the at least one reactive color ink applied in the area is at least equal to 10%.

5. An ink jet recording method according to claim 1, wherein the area includes a print area formed with the black ink and an area surrounding the print area, a distance between an edge of the print area and an outer edge of the surrounding area being up to four pixels.

6. An ink jet recording method according to claim 1, wherein the metal ion is at least one polyvalent metal cation selected from a group consisting of $Mg^{2+}$, $Ca^{2+}$, $Cu^{2+}$, $Co^{2+}$, $Ni^{2+}$, $Fe^{2+}$, $La^{3+}$, $Nd^{3+}$, $Y^{3+}$, and $Al^{3+}$.

7. An ink jet recording method according to claim 1, wherein each reactive color ink contains metal salt whose amount is within a range of from 0.1 to 15% by weight based on a total weight of the reactive color ink.

8. An ink jet recording method that uses an ink set including a black ink and a plurality of color inks, at least one of the plurality of color inks containing a metal ion and being a reactive color ink that exhibits mutual reactivity with the black ink, each color ink other than the at least one reactive color ink being a non-reactive color ink that exhibits non-reactivity with the black ink, the ink jet recording method comprising:

a step for applying the at least one reactive color ink in an area in which the metal ion becomes effective at promoting a reaction between the black ink and the at least one reactive color ink, wherein an application amount per unit area of the metal ion applied in the area is at least equal to 0.1 ng/mm**2, and the at least one reactive color ink is applied in the area so that a value at least equal to 0.01 is obtained from a calculation where the metal ion concentration in percent by weight in the at least one reactive color ink applied in the area is multiplied by a print duty percentage of the at least one reactive color ink applied in the area.

9. An ink jet recording method according to claim 8, wherein the black ink contains salt and uses a black pigment as a coloring material.

10. An ink jet recording method according to claim 8, wherein a total application amount of the at least one reactive color ink applied in the area is at least equal to 50% of a total application amount of each non-reactive color ink applied to the area.

11. An ink jet recording method according to claim 8, wherein the print duty of the at least one reactive color ink applied in the area is at least equal to 10%.

12. An ink jet recording method according to claim 8, wherein the area includes a print area formed with the black ink and an area surrounding the print area, a distance between an edge of the print area and an outer edge of the surrounding area being up to four pixels.

13. An ink jet recording method according to claim 8, wherein the metal ion is at least one polyvalent metal cation selected from a group consisting of $Mg^{2+}$, $Ca^{2+}$, $Cu^{2+}$, $Co^{2+}$, $Ni^{2+}$, $Fe^{2+}$, $La^{3+}$, $Nd^{3+}$, $Y^{3+}$, and $Al^{3+}$.

14. An ink jet recording method according to claim 8, wherein each reactive color ink contains metal salt whose amount is within a range of from 0.1 to 15% by weight based on a total weight of the reactive color ink.

15. An ink jet recording method that uses an ink set including a black ink and a plurality of color inks, at least one of the plurality of color inks being a reactive color ink that exhibits mutual reactivity with the black ink, each color ink other than the at least one reactive color ink being a non-reactive color ink that exhibits non-reactivity with the black ink, wherein the plurality of color inks include specific color inks that have a relation where overlaying of the specific color inks produces a black color, the specific color inks include at least one of the at least one reactive color ink and are applied in an area including at least a print area formed with the black ink, and the at least one reactive color ink is applied in the area so that a value of at least equal to 0.01 is obtained from a calculation where the metal ion concentration in percent by weight in the at least one reactive color ink applied in the area is multiplied by a print duty percentage of the at least one reactive color ink applied in the area.

16. An ink jet recording method according to claim 15, wherein the specific color inks are a yellow ink, a cyan ink, and a magenta ink.

17. An ink jet recording method according to claim 16, wherein the at least one reactive color ink is the cyan ink.

18. An ink jet recording method according to claim 15, wherein the specific color inks are a cyan ink and a red ink.

19. An ink jet recording method according to claim 15, wherein the area includes the print area formed with the black ink and an area surrounding the print area, a distance between an edge of the print area and an outer edge of the surrounding area being up to four pixels.

* * * * *

UNITED STATES PATENT AND TRADEMARK OFFICE
CERTIFICATE OF CORRECTION

PATENT NO. : 6,435,658 B1
DATED : August 20, 2002
INVENTOR(S) : Masao Kato et al.

It is certified that error appears in the above-identified patent and that said Letters Patent is hereby corrected as shown below:

Column 1,
Line 34, "an" should read -- a --.

Column 5,
Line 56, "a" should read -- as --.

Column 7,
Line 41, "start" should read -- starts --.

Column 11,
Lines 39 and 40, "black" should read -- blacks --.
Line 44, "in," should read -- ink, --.

Column 14,
Line 4, "These" should read -- This --.

Column 21,
Line 44, Table 9, "↑" should read -- : --.

Column 22,
Line 14, "link" should read -- ink --.
Lines 17, 37, 40 and 44, "effect" should read -- effective --.

Column 23,
Line 7, "land" should read -- and --.
Line 44, "ng/mm**2" should read -- $ng/mm^2$ --.

UNITED STATES PATENT AND TRADEMARK OFFICE
CERTIFICATE OF CORRECTION

PATENT NO. : 6,435,658 B1
DATED : August 20, 2002
INVENTOR(S) : Masao Kato et al.

It is certified that error appears in the above-identified patent and that said Letters Patent is hereby corrected as shown below:

Column 24,
Line 31, "color," should read -- color, and --.

Signed and Sealed this

Twenty-second Day of April, 2003

JAMES E. ROGAN
*Director of the United States Patent and Trademark Office*